Figure 1:
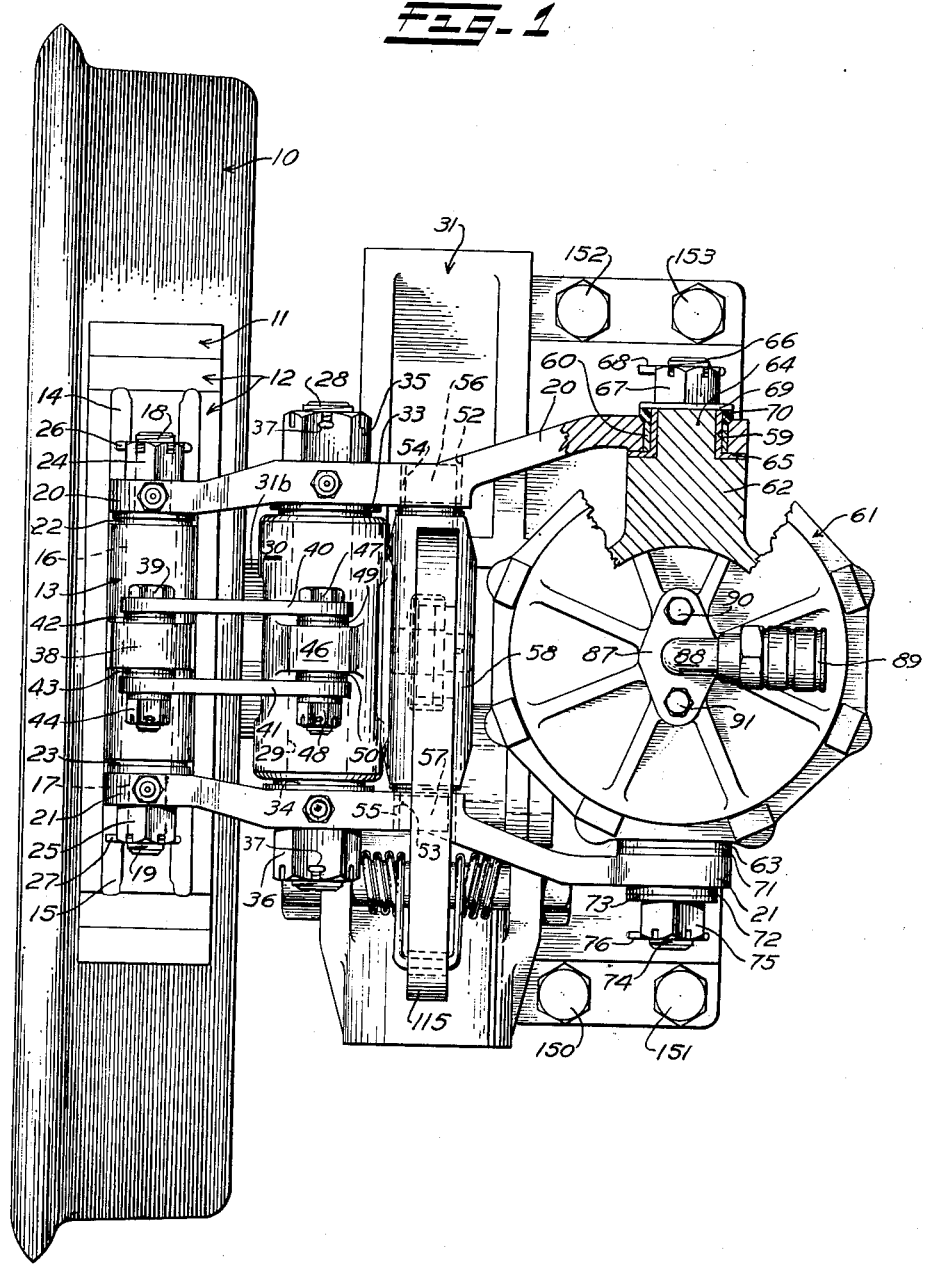

Oct. 17, 1961 E. G. MUELLER 3,004,632
TREAD BRAKE APPARATUS FOR RAILWAY CARS
Filed June 28, 1956 3 Sheets-Sheet 2

INVENTOR.
Emil G. Mueller
BY
Adelbert A. Steinmiller
ATTORNEY

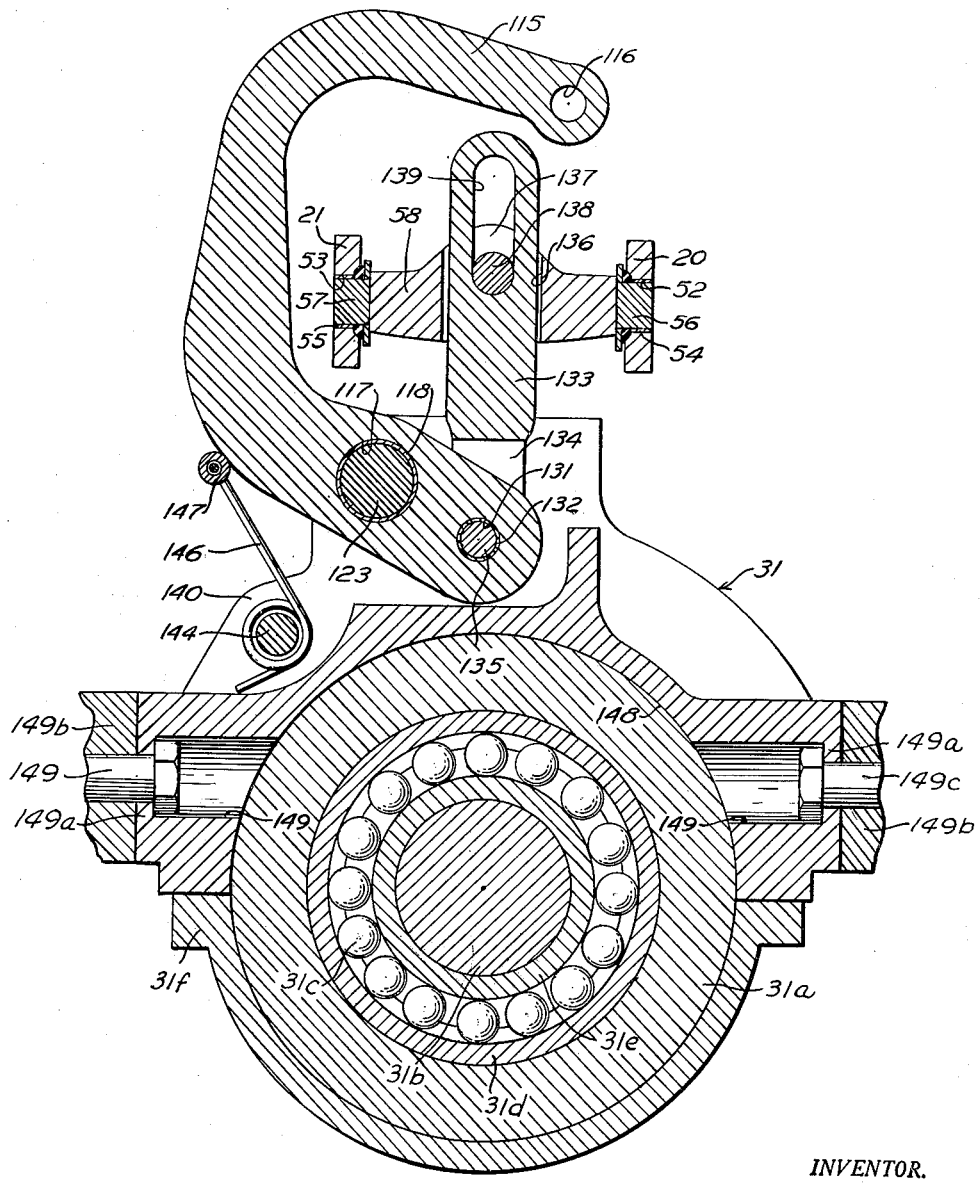

United States Patent Office 3,004,632
Patented Oct. 17, 1961

3,004,632
TREAD BRAKE APPARATUS FOR RAILWAY CARS
Emil G. Mueller, Wilkinsburg, Pa., assignor to Westinghouse Air Brake Company, Wilmerding, Pa., a corporation of Pennsylvania
Filed June 28, 1956, Ser. No. 594,548
17 Claims. (Cl. 188—57)

This invention relates to tread brake apparatus for wheels of railway cars, providing an improved type of tread brake unit suited particularly for application to the wheels of new, lightweight railway cars where available space for brake rigging is limited, and the weight of the brake apparatus must be minimized. In particular, the invention relates to brake apparatus for use on single-axle cars.

In conventional types of railway cars, brake apparatus of the clasp type comprises a brake shoe suspended on so-called brake hangers, and which is operatively connected by rigging to a brake cylinder usually located on the car or truck a substantial distance from the brake shoe.

In the new types of lightweight cars, and in particular single-axle cars where, for example, a first car is attached at the front end thereof to a second or leading car which carries the front end of the first car, with an axle at the opposite or rear end of the first car capable of carrying that end of the first car plus the weight of the adjacent end of the next or third car secured thereto, the use of conventional types of brake apparatus is precluded. The single-axle car, being designed with a low center of gravity, necessitates compact axle and truck design.

The apparatus of the instant invention meets the requirements of new, lightweight, low center of gravity railway cars, including single-axle cars, by providing a saddle preferably mounted on the journal box for the axle, outboard of the wheel, and having one end of a piston rod pivotally secured thereto. A piston secured to the other end of the piston rod is enclosed by a brake cylinder which moves when fluid under pressure is admitted thereto. The cylinder is operatively connected to a brake shoe holder by levers fulcrumed on means carried by the saddle, movement of the shoe holder carrying a brake shoe attached thereto into braking engagement with the tread at the top of the wheel. Pantograph means is provided for insuring that the brake shoe moves downward in a substantially straight line. The brake unit assembly includes means for manual brake operation at the car.

It is accordingly the principal object of the invention to provide new and improved tread brake apparatus especially suitable for use on low center of gravity, single-axle cars.

Another object of the invention is to provide new and improved tread brake apparatus suitable for mounting on the journal box for the axle of the car wheel to be braked in close proximity to the wheel.

Another object is to provide new and improved tread brake apparatus of the type in which the brake shoe is located above the wheel to be braked and moves downward to apply braking forces thereto.

Still another object is to provide compact tread brake apparatus of the type in which a piston remains substantially stationary while a brake cylinder moves with respect thereto when fluid under pressure is introduced into the cylinder, and compact lever means is provided coupling the brake cylinder to a brake shoe holder.

A further object is to provide compact tread brake apparatus suitable for use either as a fluid pressure operated brake or as a manually operated parking brake.

Other objects and advantages will become apparent after a perusal of the following specification when studied in connection with the accompanying drawings.

Figure 2:
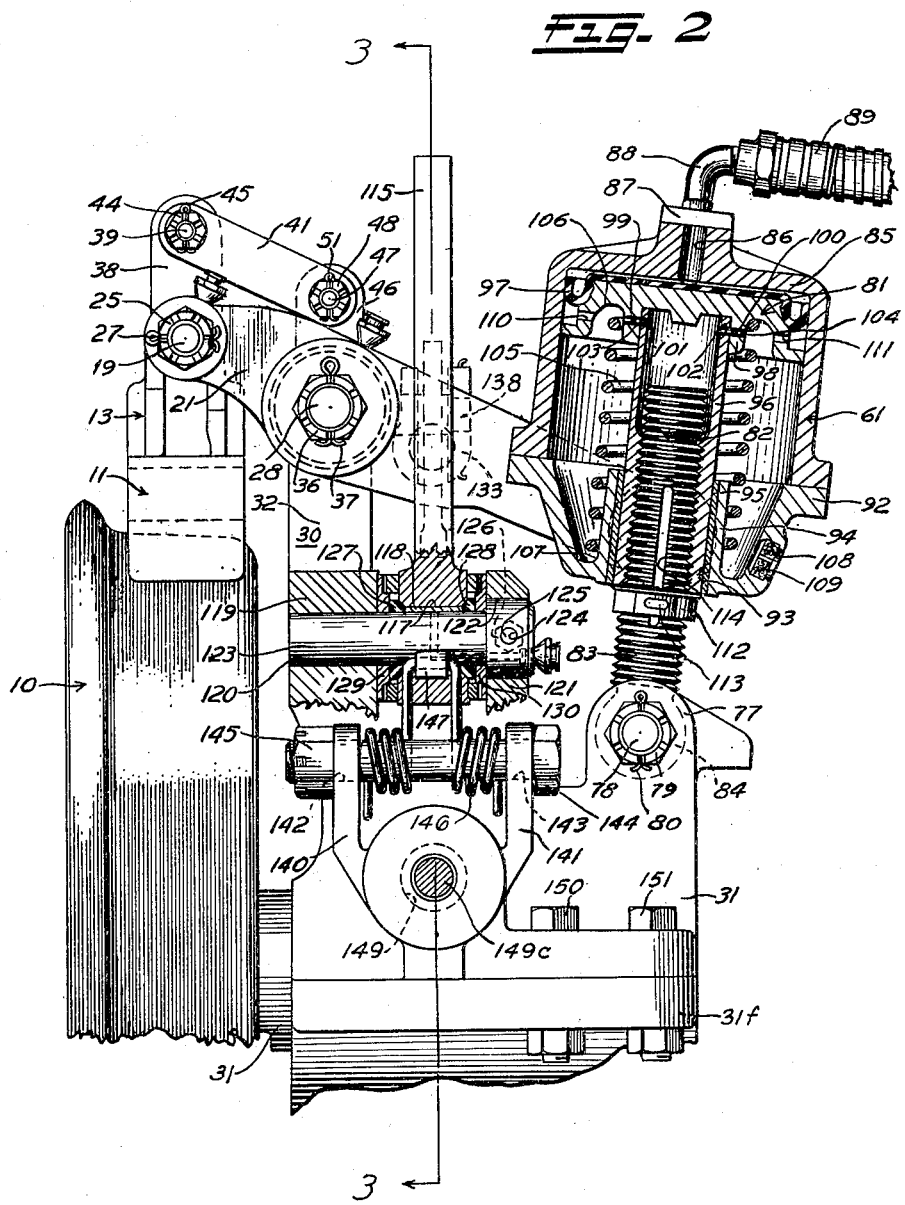

FIG. 1 is a plan view, partially broken away, of tread brake apparatus constructed according to the preferred embodiment of the invention;

FIG. 2 is a side view, partially in elevation and partially in cross-section, showing the interior construction of the brake cylinder of FIG. 1 and the mounting arrangement for the manually controlled lever of FIG. 1, the scale of FIG. 2 being somewhat smaller than the scale of FIG. 1; and FIG. 3 is a cross-sectional view, with the background removed for clarity of illustration, in a plane substantially perpendicular to the plane of FIG. 2 along the line 3—3 thereof, through the manually controlled lever and associated parts of the apparatus, the scale of FIG. 3 being somewhat smaller than the scale of FIG. 1.

Particular reference should be made now to the drawings in which like reference numerals are used throughout to designate like parts, and in particular to FIG. 1 thereof, for a more detailed understanding of the invention, in which the reference numeral 10 generally designates the wheel to be braked. A brake shoe generally designated 11, having a backing plate portion generally designated 12, has a shoe lug, not shown, which is adapted to fit into a shoe lug pocket, not shown, in a brake shoe holder or brake head 13. The brake shoe holder 13 has extended arm portions 14 and 15 adapted to support the brake shoe while the shoe is mounted thereon. Any convenient means, not shown, may be employed for securely holding the brake shoe 11 to the shoe holder 13. The brake shoe holder 13 has a bore 16 extending longitudinally thereof in the top portion of the holder, in which is disposed bushing means, not shown, and a pin or bolt designated 17, the bolt 17 having threaded end portions 18 and 19, the bolt 17 passing through bores in a pair of lever arms 20 and 21, which arms are spaced from the brake shoe holder 13 by washers 22 and 23 respectively, the ends 18 and 19 of the aforementioned bolt 17 having nuts 24 and 25 respectively in threaded engagement thereon and cotter pins 26 and 27 for holding the nuts 24 and 25 securely in threaded engagements on the bolt. Accordingly, when the lever arms 20 and 21 move in a manner hereinafter to be more fully described, the brake shoe holder 13 and the brake shoe 11 move with the lever arms toward or away from the wheel 10.

Lever arms 20 and 21 have their fulcrums provided by a fulcrum pin or bolt 28 which passes through a bore or bores 29 in a support member 30 which may have any convenient shape and which is preferably formed integrally with a pair of supporting posts or arms which are attached at the bottom ends thereof to and preferably formed integrally with a saddle member generally designated 31, which, as shown in FIG. 3, is preferably mounted on top of a journal box 31a surrounding the journal of an axle 31b of the wheel outboard of the wheel, conventional roller bearings 31c being carried between an outer race 31d which bears against the journal box and an inner race 31e which bears against the journal of the axle. The saddle member 31 has a complementary semi-circular member 31f disposed at the under side of the journal box 31a and suitably clamped to the saddle member by such as a plurality of bolts 150, 151, 152, 153 and nuts. The saddle member 131 has a generally semi-circular surface 148 which engages the outer periphery of the journal box 31a and has a pair of coaxially aligned bores 149 which extend in opposite directions from said semi-circular surface above the axis of the axle 31b. The outer ends of these bores 149 terminate at inwardly directed annular flanges 149a. The saddle member 31 is suitably secured to a member 149b constituting part of the unsprung portion of the vehicle, such as by bolts 149c which bear against the flanges 149a. Thus, the members 30, 31 constitute means rigidly connected to the unsprung portion of the vehicle. One of the posts or arms of member 30 is shown in FIG. 2 and designated by the reference numeral 32. Surrounding bolt 28 in support member 30 is a bushing, not shown, and a pair of washers 33 and 34, FIG. 1, are interposed between arms 20 and 21 respectively and the member 30. Nuts 35 and 36 are in threaded engagement on the threaded ends of bolt 28, the nuts having cotter pins associated therewith, one of the pins being shown in FIG. 2 and designated 37. Preferably the bores, not shown, in the arms 20 and 21 respectively through which the bolt 28 passes, have bushings, not shown, interposed between the bolt and the wall of the bore.

A pantograph mechanism is provided to guide the aforementioned brake shoe 11 downwardly in a straight line motion. The pantograph mechanism includes an arm 38 extending vertically from the aforementioned brake shoe holder 13. Preferably the arm 38 is formed integrally with the member 13. The arm 38 has a bore therein through which passes a bolt 39. The bolt 39 passes through bores, not shown, in a pair of arms or links 40 and 41 disposed on either side of arm 38 and separated therefrom by washers 42 and 43 respectively, bolt 39 having in threaded engagement on the threaded end thereof a nut 44 having a cotter pin 45, FIG. 2.

The aforementioned support member 30 also has an arm 46 extending upwardly therefrom and preferably formed integrally therewith, arm 46 having a bore, not shown, in the upper end thereof. A bolt 47 passes through bores, not shown, in the adjacent ends of links or arms 40 and 41, the bolt 47 passing through the bore in the end of the aforementioned arm 46 and having nut 48 in threaded engagement on the end thereof, washers 49 and 50 being provided as shown, the nut 48 having cotter pin 51 associated therewith, FIG. 2.

The aforementioned arms 20 and 21 have a pair of bores 52 and 53 therein respectively, FIG. 1, in which are mounted a pair of bushings 54 and 55 respectively. Journalled in these bushings are the ends 56 and 57 of a member 58 which is adapted to be moved in response to movement of a manually controlled lever 115 when the apparatus is used as a parking brake, in a manner hereinafter to be made more clearly apparent.

The righthand ends of the lever arms 20 and 21, as seen in FIG. 1, have a pair of bores therein, one of the bores, that for arm 20, being shown and designated 59. The bore 59 has a bushing 60 disposed therein. The brake cylinder generally designated 61, FIGS. 1 and 2, has a pair of extending arm portions 62 and 63 on the lower end thereof, the arm portions 62 and 63 having ends of reduced diameter, one of the portions of reduced diameter being shown at 64, portion 64 having a bushing member 65 disposed therearound and a threaded end 66 having in threaded engagement thereon a nut 67 with locking pin 68 associated therewith. The aforementioned bushing member 65 passes through the aforementioned bushing 60. A washer 69 is provided as shown and a resilient sealing or washer member 70 is also provided to prevent the entry of foreign matter into the bearing. This arrangement provides for pivotally attaching the end of the lever arm 20 to the bottom of the aforementioned brake cylinder 61.

On the other side of the brake cylinder 61, the aforementioned lever arm 21 is operatively connected or pivotally attached to the aforementioned arm portion 63 in a similar manner, a bushing member being shown at 71, a resilient member at 72, a washer at 73, and a threaded end at 74 having nut 75 and cotter pin 76. The brake cylinder 61 is adapted to move upward, FIG. 2, when fluid under at least a predetermined pressure is introduced into the cylinder and to carry with it the adjacent ends of the arms 20 and 21, which pivot about the bolt 28 passing through fulcrum support member 30, and move the brake shoe holder generally designated 13 downward carrying the brake shoe 11 into braking engagement with the tread of wheel 10.

Particular reference should be made now to FIG. 2 in which the interior of the brake cylinder generally designated 61 is shown in detail. The aforementioned saddle member generally designated 31 has on the side thereof away from the wheel to be braked a pair of vertically extending arms, one of the arms being shown in FIG. 2 and designated 77. Arm 77 has a bore, not shown, in the end thereof in alignment with a similar bore in the other aforementioned arm, not shown, but which is located back of arm 77 as seen in FIG. 2. A bolt 78 passes through the last named bores in the pair of arms including arm 77 and has in threaded engagement on the threaded end thereof a nut 79 with cotter pin 80. The brake cylinder apparatus as aforementioned is adapted to move while a piston therein remains substantially stationary. To this end the piston generally designated 81, located in brake cylinder 61, has a piston rod generally designated 82 which has a threaded portion 83 in the lower end of which there is an attaching collar portion 84 which has a bore or eye, not shown, therein through which the aforementioned bolt 78 passes, swivelly connecting the end of the threaded portion 83 to the aforementioned pair of arms including arm 77 extending upwardly from saddle member 31.

The aforementioned brake cylinder 61 has an upper portion or pressure head 85 in which there is a bore 86 which is provided to admit fluid under pressure into a pressure chamber defined between piston 81 and said pressure head and exhaust fluid from said pressure chamber. Mounted on the top of the brake cylinder is an attaching member 87 having a pipe portion 88 formed integrally therewith to which is attached the flexible hose 89, the attaching member 87 being held to the top of the brake cylinder 85 by a pair of bolts 90 and 91, FIG. 1. It should be understood that hose 89 is connected by way of valve means, not shown, to a source of fluid under pressure, not shown, for example, compressed air. Secured to the upper portion 85 is a lower brake cylinder portion 92, which has a large bore 93 in the lower end thereof, and an inwardly extending annular lip portion 94, in which is disposed a bushing 95. Slidably mounted in the bushing 95 is a metallic sleeve 96 which forms a part of the aforementioned piston rod generally designated 82, and which has a portion of the inside thereof threaded for attaching to the threaded piston rod portion 83. The aforementioned piston 81 has a snap-on packing cap 97 made of rubber or other suitable resilient material and has an inwardly extending annular lip portion 98. In the annular lip portion 98 are a pair of bores 99 and 100 which are in alignment with bores 101 and 102 respectively in the adjacent end of the aforementioned metallic sleeve 96 and through which pass a pair of locking pins 103 and 104 respectively for holding the metallic sleeve 96 to the annular lip portion 98 of the piston 81. A helical brake cylinder return spring 105 disposed in the brake cylinder engages an inner shoulder 106 of the piston 81 and a shoulder 107 in the lower brake cylinder portion 92 for urging the brake cylinder 61 downwardly relative to the piston 81. A bore 108 is provided in the lower portion 92 for housing a filter vent element 109 which is provided for reasons which will be obvious to those skilled in the art to which the invention pertains. Bores 110 and 111 are provided in the side wall of the piston, as shown.

As aforementioned, the threaded end of piston rod portion 83 is in threaded engagement with the threaded inner wall of the bore in the lower portion of metallic sleeve 96. It is desirable that means be provided for taking up slack in the operation of the apparatus, and to this end the aforementioned metallic sleeve 96 forming a part of the piston rod generally designated 82 may be moved axially with respect to the threaded portion 83 of the piston rod by turning the portion 96 to provide the aforementioned slack adjustment. A collar 112 is attached to the sleeve 96 at the lower end thereof, and the collar has a pair of apertures on either side thereof through which a cotter pin 113 passes, the cotter pin 113 passing through a slot 114 in threaded portion 83 thereby preventing rotation of portions 83 and 96 of the piston rod with respect to each other to change the slack adjustment. If it is desired to make a manual slack adjustment, the cotter pin 113 is removed and a wrench applied to the extended portion of the sleeve 96 to turn the piston, causing it to move either up or down on the piston rod depending upon the take-up or let-out of the slack. After the proper adjustment has been made, the cotter pin is replaced through the apertures in the sleeve collar and the slot in the piston rod. The upper and lower portions 85 and 92 of the brake cylinder may be secured together in any convenient manner as by the use of bolts.

Movement of the brake cylinder generally designated 61 upward in response to entry of compressed air causes bias spring 105 to be compressed. When air is exhausted from the cylinder, spring 105 forces the cylinder to return to the position shown in FIG. 2.

As stated hereinbefore, one of the objectives of the invention is to provide tread brake apparatus suitable for use as a manually operated parking brake as well as a brake operated by fluid pressure. To this end the aforementioned cross-member 58 having its ends 56 and 57 journalled in bushings 54 and 55 mounted in bores 52 and 53 in the lever arms 20 and 21 respectively has been provided, and the member 58 is moved upward in response to movement of the manually controlled lever 115, in a manner to be presently made more clearly apparent. Particular reference should be made now to FIG. 3. The lever 115 has adjacent one end a hole 116 for permitting a cable, not shown, to be attached to the lever so that it may be manually operated for manually applying brakes. The lever 115 has a bore 117 therein in which is disposed a bushing 118. Located in one of the aforementioned arm portions which support the member 30, the other one of the arm portions being shown at 32, FIG. 2, is an enlarged portion 119 having a bore 120 therein. A vertically extending arm 121 extends upward from the saddle member generally designated 31 and is preferably formed integrally therewith. The arm 121 has a bore 122 therein, bore 122 being in substantial alignment with the aforementioned bore 120 but somewhat larger in diameter. Mounted in the bores 122 and 120 is a fulcrum pin 123 which passes through the aforementioned bushing 118 and rockably supports the lever arm 115 intermediate its ends. The fulcrum pin 123 has a bore 124 running transversely of the head portion thereof, through which a pin or bolt 125 passes, the bolt 125 having a locking nut 126 on the end thereof outside of the arm 121. It will be understood that the bolt 125 passes through two bores, not shown, and the wall portion of arm 121, the bolt 125 and the nut 126 securely holding the fulcrum pin 123 in place in the bores 120 and 122. A pair of resilient sealing members 127 and 128 are provided on either side of lever arm 115, FIG. 2, to prevent the entry of moisture or other extraneous matter into the bearing, and a pair of spacer washer members 129 and 130 are provided as shown.

At its end farthest from bore 116 the lever 115 has a bore 131 therein, FIG. 3, in which is disposed a bushing 132. A pusher element generally designated 133 has the lower end thereof forked into a pair of downwardly extending arm portions, one of the arm portions being shown in FIG. 3 and designated 134. The portion 134 has a bore in the end thereof, not shown, in substantial alignment with the bore 131 in lever 115 while the lever is in a position shown in FIG. 3. The other arm portion, not shown, of pusher member or link 133 extends in front of the lever 115 as seen in FIG. 3, and also has a bore, not shown, therein in alignment with the aforementioned bore 131. A bolt 135 passes through the aforementioned bores in the arm portions including arm portion 134 and through the aforementioned bushing 132, the bolt 135 having a locking nut, not shown, associated with the threaded end thereof, and a cotter or locking pin, not shown. This arrangement pivotally connects the end of lever 115 to the pusher element 133. Member 133 is slidable in a groove or slot 136 in the aforementioned cross-member 58. Member 58 may have upwardly flaring side wall portions on either side of the slot 136, one of the side wall portions being shown at 137, in which upwardly flaring portions are a pair of aligned bores, not shown, in which last named pair of bores is fixedly secured a pin or bar member 138 which is movable in the slot 139 in member 133. As aforementioned, the ends 56 and 57 of the member 58 are journalled in bushings 54 and 55 respectively mounted in bores 52 and 53 respectively in the aforementioned lever arms 20 and 21 respectively. Accordingly, when the top end of the lever 115 is moved to the left, FIG. 3, it rocks about the fulcrum pin 123, and the lower end thereof, which is coupled by bolt 135 to member 133 moves upward carrying member 133 with it, and the pin 138 in slot 139 is forced upward carrying with it the member 58 and the ends of the lever arms 20 and 21 which are pivotally connected thereto, thereby causing the brake shoe 11 to move downward, FIG. 2, into braking engagement with the tread of wheel 10. The aforementioned slot 139 is provided so that when fluid under pressure is introduced into the aforementioned brake cylinder 61 to move the lever arms 20 and 21 upward and apply the brakes, this upward movement of the lever arms 20 and 21 does not cause a corresponding movement of the member 133 and the operatively connected lever 115.

The saddle member 31 has a pair of integrally formed spaced lugs 140 and 141, FIG. 2, having aligned bores 142 and 143 respectively, through which passes a bolt 144 having nut 145 in threaded engagement with the threaded end thereof. Wound around this bolt 144 is a spring member 146 which may have a shape similar to a "mouse trap" spring and which has at its free end roller 147 that engages the lever 115 and tends to urge the lever 115 into the position shown in FIG. 3.

Summarizing the operation of the aforedescribed apparatus, assume by way of example that the brake is in a "brakes released" position such as that shown in FIG. 2 where the brake shoe 11 is not making braking engagement with the tread of wheel 10. Assume now that it is desired to apply the brakes by introducing fluid under pressure into the brake cylinder 61. Fluid under pressure, for example, compressed air is admitted through hose 89, connector 88, member 87, and aperture 86 into the brake cylinder 61, and acting against the packing cup 97 forces the head 85 of the cylinder upward, as viewed in FIG. 2, against the bias of spring 105 and away from the packing cup 97. As the brake cylinder 61 moves upward it will rock the lever arms 20 and 21 counter-clockwise about fulcrum pin 28 and cause said arms 20 and 21, through the medium of pin 17 and brake head 13, to operatively carry the brake shoe 11 into braking engagement with the wheel 10. Assume now that it is desired to release the brakes. The fluid under pressure is exhausted from brake cylinder 61 by way of aperture 86 and the aforementioned hose 89, and the spring 105 pressing against the aforementioned shoulders 107 and 106 forces the brake cylinder 61 downward, FIG. 2, for rocking the arms 20 and 21 clockwise about pin 28 for operatively disengaging the brake shoe 11 from wheel 10.

Assume now by way of example that the apparatus is in the "brakes released" position shown, and that it is desired to apply the parking brake. The lever 115 is pulled to the left, FIG. 3, for rocking lever 115 about pin 123 and thereby causing bolt 135 and member 134 to move upward, and cause member 133 to shift the pin 138 upward in slot 139 for causing pin 138 to move member 58 and thereby moves the adjacent ends of arms 20 and 21 upward; this, in turn, will cause arms 20 and 21 to rock about fulcrum pin 28, such that the opposite ends of arms 20 and 21 will be moved downward, carrying with them the brake head 13 and the brake shoe 11, until the brake shoe 11 makes braking engagement with the tread of wheel 10. Assuming now that the force exerted on the manually operated parking brake lever 115 is released, spring 105 will force the brake cylinder 61 downward, rock the arms 20 and 21 for causing the brake shoe 11 to move upward out of engagement with wheel 10. The aforementioned "mouse trap" spring 146 does not provide the force which releases the parking brake, but does normally prevent rattling or jiggling of the lever 115 while it is in a "brakes released" position as shown in FIG. 3.

Whereas the invention has been illustrated in connection with the conventional type of railway car in which a rotating axle is journalled in a journal box secured to the frame of the car, the invention may be used on railway cars of the type in which the wheel is journalled for rotation on a non-rotating axle secured to the frame, in which case the saddle member may rest upon and be supported by the non-rotating axle.

Having now described the invention, what I claim as new and desire to secure by Letters Patent, is:

1. Tread brake apparatus for use on a vehicle having an axle, a journal for the axle, and a wheel to be braked mounted on the axle, said apparatus comprising, in combination, saddle means mounted on the journal, piston rod means having one end thereof pivotally connected to said saddle means and having a piston operatively connected to the other end thereof, a brake cylinder in which said piston operates, said brake cylinder being chargeable with fluid under pressure for moving the brake cylinder with respect to the piston, resilient biasing means for said brake cylinder, lever means operatively connected at one end thereof to said brake cylinder, fulcrum means rockably mounting said lever means on said saddle means, and brake shoe means operatively connected to the other end of said lever means, movement of said brake cylinder against the tension of said resilient biasing means when fluid under at least a predetermined pressure is introduced into said brake cylinder moving said lever means and causing said brake shoe means to move into braking engagement with the tread of said wheel.

2. Tread brake apparatus according to claim 1 wherein said brake shoe means is additionally characterized as being normally located above said wheel, and including in addition pantograph means operatively connected to said brake shoe means and to said fulcrum means for guiding said brake shoe means downwardly in a straight line motion into braking engagement with the tread of said wheel.

3. For use with a vehicle having an unsprung portion, a brake apparatus for controlling engagement of a braking element with a rotatable member to be braked, said apparatus comprising fixed means rigidly connectable to the unsprung portion of the vehicle; a brake head connected to the braking element; a fulcrum pin carried by said fixed means; a first lever rockably fulcrumed on said fulcrum pin and having two rigid arms one of which is pivotally connected to said brake head; a manually operable lever having two arms and fulcrumed intermediate its arms on said fixed means; means, including a pin-and-slot connection, for operatively connecting one arm of said manually operable lever to the other rigid arm of said first lever; and a brake cylinder device comprising a brake cylinder return spring, a non-reciprocable piston means pivotally connected to said fixed means, and a cylinder having a pressure head, said cylinder surrounding, and being reciprocable relative to, said piston means according as pressure in a pressure chamber defined between said pressure head and one side of said piston means is greater than or less than the opposing bias effect of said return spring; said cylinder being pivotally connected to said other arm of said first lever, such that said first lever is normally biased by said return spring acting through said cylinder to a position for causing the brake head to hold the braking element disengaged from the member to be braked, and said first lever is operable alternatively in response to application of manual force to the other arm of said manually operable lever or to pressurization of said chamber to move against resistance of said return spring for operatively effecting engagement of the braking element with the member to be braked, said pin-and-slot connection permitting lost motion so that upon movement of said first lever responsively to pressurization of said chamber said first lever will not rock said manually operable lever.

4. The combination according to claim 3, including an anti-rattler spring, of substantially less force than said return spring, supported by said fixed means and acting on said manually operable lever for biasing the latter against vibrational movement when no manual force is applied thereto.

5. The combination according to claim 3, wherein said non-reciprocable piston means comprises a piston subject opposingly to pressure of fluid in said pressure chamber and to pressure of said return spring, an externally screw-threaded piston rod pivotally connected to said fixed means, a sleeve having encircling screw-threaded engagement with said piston rod and coaxially engaging said piston, said cylinder being biased by said return spring to a normal position defined by contact of said pressure head with said piston for thereby defining a normal position of said first lever, said sleeve being manually adjustable axially for varying the normal distance between said piston rod and piston for thereby so varying the normal position of said cylinder and thereby of said first lever as to vary the normal slack between the braking element and the member to be braked.

6. For use with a vehicle having an unsprung portion, a brake apparatus for controlling engagement of a braking element with a rotatable member to be braked, said apparatus comprising fixed means rigidly connectable to the unspring portion of the vehicle, a brake cylinder device comprising a sectionalized cylinder having a pressure head, bias means, a brake cylinder piston slidably mounted in said cylinder and subject opposingly to pressure of fluid in a pressure chamber defined between said pressure head and piston and to pressure of said bias means, and non-reciprocable piston rod means pivotally connecting said piston with said fixed means to permit pivoting of said brake cylinder device relative to said fixed means; a brake head connected to the braking element; a fulcrum pin carried by said fixed means; first lever means rockably fulcrumed intermediate its ends on said fulcrum pin and pivotally connected adjacent one end to said cylinder and pivotally connected adjacent the opposite end to said brake head; a second pin carried by said fixed means; manually operable lever means rockably fulcrumed intermediate its ends on said second pin; means operatively connecting one arm of said manually operable lever means to said first lever means intermediate said fulcrum pin and cylinder, such that by application of manual force to the other arm of said manually operable lever means said first lever means will be rocked against resistance of said bias means for operatively effecting engagement of the braking element with the member to be braked, and upon pressurization of said pressure chamber said cylinder will be moved relative to said piston and piston rod means and against resistance of said bias means for causing said first lever means to operatively effect engagement of the braking element with the member to be braked, and upon release of such manual force concurrently with venting of said pressure chamber said bias means will operatively through the medium of said first lever means effect disengagement of the braking element from the member to be braked.

7. The combination according to claim 6, including pantograph means for causing said brake head to move in a substantially straight line in effecting such engagement and disengagement of the braking element, said pantograph means comprising a third pin having an axis spaced in one plane a selected distance from that of the fulcrum pin and carried by said fixed means, a fourth pin carried by said brake head and having an axis spaced, in a plane parallel to said one plane, said selected distance from the axis of pivotal connection of the first lever means with the brake head, and a link pivotally connected to said third pin and fourth pin.

8. For use with a vehicle having an upsprung portion, a brake apparatus for controlling engagement and disengagement of a braking element with a rotatable member to be braked, said apparatus comprising fixed means connectable to the unsprung portion of the vehicle; a brake head connected to the braking element; a fulcrum pin carried by said fixed means; a lever rockably fulcrumed on said fulcrum pin and having one rigid arm pivotally connected to said brake head; and a brake cylinder device comprising a brake cylinder return spring, a non-reciprocable piston having hinged connection with said fixed means, and a cylinder surrounding, and reversely movable in relation to, said piston and connected to the other rigid arm of said lever, said cylinder normally being biased by said return spring to one position for causing said lever to effect such disengagement and movable by fluid under pressure to another position against resistance of said return spring for causing said lever to effect such engagement, said hinged connection permitting rocking of said piston and cylinder so as to impede rocking of said lever.

9. Tread brake apparatus for use on a vehicle having an axle, a journal for the axle, and a wheel to be braked mounted on the axle, said apparatus comprising, in combination, saddle means mounted on the journal, piston rod means having one end thereof pivotally connected to said saddle means and having a piston operatively connected to the other end thereof, a brake cylinder in which said piston operates, said brake cylinder being chargeable with fluid under pressure for moving the brake cylinder with respect to the piston, lever means operatively connected at one end thereof to said brake cylinder, fulcrum means rockably mounting said lever means on said saddle means, and brake shoe means operatively connected to the other end of said lever means, movement of said brake cylinder when fluid under at least a predetermined pressure is introduced into said brake cylinder moving said lever means and causing said brake shoe means to move into braking engagement with the tread of said wheel.

10. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an angular surface of said wheel, a shoe operating lever pivotally attached thereto at one end with its remaining end extending outwardly therefrom and being pivotally attached to a lever actuating means, shoe movement control means operatively associated with said shoe and shoe operating lever to maintain said shoe at substantially right angles to said annular surface during movement toward and away from said surface, said lever actuating means including a movable cylinder housing a piston-like element pivotally carried by said saddle member, fluid pressure supply means forming a part of a brake actuating system communicating with said cylinder to move the same relative to said piston-like element, said shoe operating lever being fulcrumed relative to said saddle member intermediate its ends by means carried by said saddle member to impart a rocking action thereto upon movement of said cylinder, and a manually actuated lever pivotally carried by said saddle member and attached to said shoe operating lever by lost motion connection means to actuate the same independent of the operation of said brake actuating system.

11. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an annular surface of said wheel, a shoe operating lever pivotally attached thereto at one end with its remaining end extending outwardly therefrom and being pivotally attached to a lever actuating means, shoe movement control means operatively associated with said shoe and shoe operating lever to maintain said shoe at substantially right angles to said annular surface during movement toward and away from said surface, said lever actuating means including a movable cylinder housing a piston-like element pivotally carried by said saddle member, fluid pressure supply means forming a part of a brake actuating system communicating with said cylinder to move the same relative to said piston-like element, said shoe operating lever being fulcrumed relative to said saddle member intermediate its ends by means carried by said saddle member to impart a rocking action thereto upon movement of said cylinder, and a manually actuated lever pivotally carried by said saddle member and attached to said shoe operating lever to actuate the same independent of the operation of said brake actuating system, the point of attachment of said manually actuated lever with said shoe operating lever including a lost motion element along which said shoe operating lever moves upon initial actuation toward one end abutment therewith, operation of said manually actuated lever rocking said shoe operating lever upon opposite end abutment of said lost motion element therewith.

12. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an annular surface of said wheel, a shoe operating lever pivotally attached thereto at one end with its remaining end extending outwardly therefrom and being pivotally attached to a lever actuating means, shoe movement control means operatively associated with said shoe and shoe operating lever to maintain said shoe at substantially right angles to said annular surface during movement toward and away from said surface, said lever actuating means including a movable cylinder housing a piston-like element pivotally carried by said saddle member, fluid pressure supply means forming a part of a brake actuating system communicating with said cylinder to move the same relative to said piston-like element, said shoe operating lever being fulcrumed relative to said saddle member intermediate its ends by means carried by said saddle member to impart a rocking action thereto upon movement of said cylinder, a manually actuated lever pivotally carried by said saddle member and attached to said shoe operating lever to actuate the same independent of the operation of said brake actuating system, the point of attachment of said manually actuated lever with said shoe operating lever including a lost motion element along which said shoe operating lever moves upon initial actuation toward one end abutment therewith, operation of said manually actuated lever rocking said shoe operating lever upon opposite end abutment of said lost motion element therewith, and resilient holding means for maintaining said manually actuated lever in its inoperative position and fixing said lost motion element for rocking action of said shoe operating lever relative thereto.

13. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an annular surface of said wheel, a shoe operating lever pivotally attached thereto at one end with its remaining end extending outwardly therefrom and being pivotally attached to a lever actuating means, said shoe movement control means operatively associated with said shoe and shoe operating lever to maintain said shoe at substantially right angles to said annular surface during movement toward and away from said surface, lever actuating means including a movable cylinder housing a piston-like element pivotally carried by said saddle member, fluid pressure supply means forming a part of a brake actuating system communicating with said cylinder to move the same relative to said piston-like element, said shoe operating lever being fulcrumed relative to said saddle member intermediate its ends by means carried by said saddle member to impart a rocking action thereto upon movement of said cylinder, a manually actuated lever pivotally carried by said saddle member and attached to said shoe operating lever to actuate the same independent of the operation of said brake actuating system, the point of attachment of said manually actuated lever with said shoe operating lever including a lost motion element along which said shoe operating lever moves upon initial actuation toward one end abutment therewith, operation of said manually actuated lever rocking said shoe operating lever upon opposite end abutment of said lost motion element therewith, and holding means for maintaining said manually actuated lever in its inoperative position and fixing said lost motion element for rocking action of said shoe operating lever relative thereto, said holding means comprising a spring carried by said saddle member and engaging said manually actuated lever to resiliently hold the same in its inoperative position, a free end of said manually actuated lever extending beyond its pivotal attachment to said saddle member and being pivotally interconnected with said lost motion element.

14. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an annular surface of said wheel, a pair of shoe operating levers extending in side-by-side relation with their inner ends pivotally attached to said brake shoe and with their remaining ends pivotally attached to opposite side surface portions of lever actuating means constituting a movable cylinder housing a piston-like element pivotally carried by said saddle member, fluid pressure supply means forming a part of a brake actuating system communicating with said cylinder to move the same relative to said piston-like element, said shoe operating levers being fulcrumed intermediate the ends thereof by pivotal attachment to support means carried by said saddle member at a point spaced from said cylinder a distance greater than from said brake shoe, a manually actuated lever pivotally carried by said saddle member transversely of said shoe operating levers and attached to said shoe operating levers to actuate the same independent of the operation of said brake actuating system, the point of attachment of said manually actuated lever with said shoe operating levers including a lost motion element received through a slotted transverse lever stabilizing member, operation of said manually actuated lever rocking said shoe operating levers upon end abutment of said lost motion element with means forming a part of said lever stabilizing member, and resilient holding means for maintaining said manually actuated lever in its inoperative position and fixing said lost motion element for rocking action of said shoe operating levers relative thereto.

15. Brake and brake operating apparatus solely carried by an arcuate saddle member removably attached to the top surface of a journal box housing a wheel-carrying axle at the outermost end portion thereof outwardly of a wheel, said apparatus including a brake shoe positioned for right angle frictional engagement with an annular surface of said wheel, a pair of shoe operating levers extending in side-by-side relation with their inner ends pivotally attached to said brake shoe and with their remaining ends pivotally attached to opposite side surface portions of lever actuating means constituting a movable cylinder housing a piston-like element pivotally carried by said saddle member, fluid pressure supply means forming a part of a brake actuating system communicating with said cylinder to move the same relative to said piston-like element, said shoe operating levers being fulcrumed intermediate the ends thereof by pivotal attachment to support means carried by said saddle member at a point spaced from said cylinder a distance greater than from said brake shoe, shoe movement control means pivotally attached at its ends to said brake shoe and said support means to maintain said brake shoe at substantially right angles to said annular surface during movement toward and away from said surface, a manually actuated lever pivotally carried by said saddle member transversely of said shoe operating levers and attached to said shoe operating levers to actuate the same independent of the operation of said brake actuating system, the point of attachment of said manually actuated lever with said shoe operating levers including a lost motion element received through a slotted transverse lever stabilizing member, operation of said manually actuated lever rocking said shoe operating levers upon end abutment of said lost motion element with means forming a part of said lever stabilizing member, and resilient holding means for maintaining said manually actuated lever in its inoperative position and fixing said lost motion element for rocking action of said shoe operating levers relative thereto.

16. Tread brake apparatus for use on a vehicle having an axle, a journal for the axle, and a wheel to be braked mounted on the axle, said apparatus comprising, in combination, means operatively mounted on the journal outboard of the wheel, a brake cylinder device comprising two members in the form of a cylinder and a piston-and-piston-rod assemblage one of which members is movable relative to the other upon supply of pressure fluid to a chamber defined between the piston and an end wall of said cylinder, and the said other of the members being attached to the first-mentioned means, lever means operatively connected to the said one of the members, fulcrum means rockably mounting said lever means on said first-mentioned means, and brake shoe means operatively connected to said lever means, movement of said one member when fluid under at least a predetermined pressure is introduced into said chamber, moving said lever means and causing said brake shoe means to move into braking engagement with the tread of the wheel.

17. Tread brake apparatus for use on a vehicle having an axle, a journal for the axle, and a wheel to be braked mounted on the axle, said apparatus comprising, in combination, means operatively mounted on the journal outboard of the wheel, piston rod means having one end thereof pivotally connected to the first-mentioned means and having a piston operatively connected to the other end thereof, a brake cylinder in which said piston operates, said brake cylinder being chargeable with fluid under pressure for moving the brake cylinder with respect to the piston, fulcrum means carried by said first-mentioned means, lever means rockably mounted on said fulcrum means and pivotally connected to the brake cylinder at a point spaced from the axis of the fulcrum means, and brake shoe means operatively connected to the lever means at a point spaced from the axis of the fulcrum means, movement of said brake cylinder when fluid under at least a predetermined pressure is introduced into said brake cylinder moving said lever means and causing said brake shoe means to move into braking engagement with the tread of said wheel.

References Cited in the file of this patent

UNITED STATES PATENTS

| | | |
|---|---|---|
| 406,844 | Lansberg | July 9, 1889 |
| 1,283,759 | Hedgcock | Nov. 5, 1918 |
| 1,397,059 | Scott | Nov. 15, 1921 |
| 1,466,452 | Lipcot et al. | Aug. 28, 1923 |
| 2,383,376 | Gaenssle | Aug. 21, 1945 |